US012766927B2

(12) United States Patent
Lee et al.

(10) Patent No.: US 12,766,927 B2
(45) Date of Patent: Oct. 20, 2026

(54) HEAT PUMP SYSTEM FOR VEHICLE

(71) Applicant: Hanon Systems, Daejeon (KR)

(72) Inventors: Dae Woong Lee, Daejeon (KR); Jae Hoon Kim, Daejeon (KR); Sang Gu Woo, Daejeon (KR); Sung Je Lee, Daejeon (KR)

(73) Assignee: HANON SYSTEMS, Daejeon (KR)

(*) Notice: Subject to any disclaimer, the term of this patent is extended or adjusted under 35 U.S.C. 154(b) by 18 days.

(21) Appl. No.: 18/846,799

(22) PCT Filed: Jun. 20, 2023

(86) PCT No.: PCT/KR2023/008511
§ 371 (c)(1),
(2) Date: Sep. 13, 2024

(87) PCT Pub. No.: WO2024/014730
PCT Pub. Date: Jan. 18, 2024

(65) Prior Publication Data

US 2026/0109197 A1 Apr. 23, 2026

(30) Foreign Application Priority Data

Jul. 14, 2022 (KR) ........................ 10-2022-0087215

(51) Int. Cl.
*B60H 1/08* (2006.01)
*B60H 1/14* (2006.01)
*B60H 1/32* (2006.01)

(52) U.S. Cl.
CPC ............. *B60H 1/3227* (2013.01); *B60H 1/08* (2013.01); *B60H 1/143* (2013.01)

(58) Field of Classification Search
CPC ................ B60H 1/3227; B60H 1/3228; B60H 1/32284; B60H 1/08; B60H 1/143; B60H 1/2215; B60H 1/2221
See application file for complete search history.

(56) References Cited

U.S. PATENT DOCUMENTS

2019/0359030 A1* 11/2019 Kim .................. B60H 1/00907
2025/0187398 A1* 6/2025 Lee .................... B60H 1/00485

FOREIGN PATENT DOCUMENTS

JP 2012232730 A 11/2012
KR 20150088953 A 8/2015
(Continued)

OTHER PUBLICATIONS

International Search Report issued in PCT/KR2023/008511 on Sep. 19, 2023.

*Primary Examiner* — Marc E Norman
(74) *Attorney, Agent, or Firm* — NORTON ROSE FULBRIGHT US LLP

(57) ABSTRACT

Heat pump system for a vehicle comprising a refrigerant line circulating through a compressor, an outdoor heat exchanger, an expansion means, and an indoor heat exchanger, in which a refrigerant circulating through the indoor heat exchanger exchanges heat with air discharged to the interior; a first coolant line which circulates through an engine and a heater core in which a coolant circulating through the heater core exchanges heat with the air discharged to the interior; and a second coolant line which circulates through an electric components and an electric radiator, a water-cooled condenser which exchanges heat between engine heat of the first coolant line and the refrigerant; and a chiller provided upstream of the compressor in the refrigerant flow direction which exchanges heat between electric heat of the second coolant line and the refrigerant, wherein the water-cooled condenser is provided downstream of the compressor in the refrigerant flow direction.

8 Claims, 8 Drawing Sheets

(56) References Cited

FOREIGN PATENT DOCUMENTS

| | | | |
|---|---|---|---|
| KR | 20180096359 | A | 8/2018 |
| KR | 20210026705 | A | 3/2021 |
| KR | 20220050560 | A | 4/2022 |

* cited by examiner

PRIOR ART

HEAT PUMP SYSTEM FOR VEHICLE

CROSS REFERENCE TO RELATED APPLICATIONS

This patent application is a national phase under 35 U.S.C. § 371 of International Patent Application No. PCT/KR2023/008511 filed Jun. 20, 2023, which claims the benefit of priority from Korean Patent Application No. 10-2022-0087215 filed Jul. 14, 2022, each of which is hereby incorporated herein by reference in its entirety for all purposes.

TECHNICAL FIELD

The present invention relates to a heat pump system for a vehicle, and more specifically, to a heat pump system for a vehicle installed in a hybrid vehicle to heat the interior without operating an engine in cold environments.

BACKGROUND ART

In general, an air conditioner for a vehicle includes a cooling system for cooling the interior of the vehicle, and a heating system for heating the interior of the vehicle. The cooling system, at an indoor heat exchanger side of a refrigerant cycle, converts the air passing the outside of an indoor heat exchanger into cold air by exchanging heat between the air and refrigerant flowing inside an evaporator. Moreover, the heating system, at a heater core side of a coolant cycle, converts the air passing the outside of the heater core into warm air by exchanging heat between the air and coolant flowing inside the heater core to heat the interior of the vehicle.

On the other hand, an electric vehicle uses a heat pump system in which the vapor compression cycle is formed in a reverse way. In this case, such a heat pump system focuses on a module for the distribution and supply of low-temperature coolant to improve the driving range based on electric waste heat, so has disadvantages in that it is difficult to be used in low outdoor temperature environments and the heat pump system must run in parallel with a high-capacity PTC heater to perform heating.

Referring to FIG. 1, the heat pump system installed in a conventional hybrid electric vehicle (HEV) comprises a compressor 8, an outdoor heat exchanger 6, an expansion valve 5, and an evaporator 3. Additionally, an accumulator 9 is provided upstream of the compressor 8 in a refrigerant flow direction. Moreover, the high-temperature and high-pressure refrigerant discharged from the compressor 8 is circulated by sequentially passing through the outdoor heat exchanger 6, the expansion valve 5, the evaporator 3, and the accumulator 9.

An evaporator 3 and a heater core 4 are sequentially equipped inside an air flow passage in an air conditioning case 1 in the air flow direction. The evaporator 3 exchanges heat with the air passing through the evaporator 3, and the heater core 4 exchanges heat with the air passing through the heater core 4 to heat the air. A temperature door 2 is provided between the indoor heat exchanger 3 and the heater core 4 to adjust the air temperature. A PTC heater 7 may be further provided downstream of the heater core 4 in the air flow direction.

Meanwhile, a coolant line passing through an engine 13 goes through a water pump 16, a reservoir tank 15, and then, passes through a radiator 14. The waste heat from the engine 13 exchanges heat with the outdoor air in the radiator 14 to be cooled. Additionally, a portion of the coolant line that passes through the engine 13 passes through a water pump 11 and the heater core 4, and then, circulates through the engine 13. The high-temperature coolant, which cooled the engine 13, exchanges heat with the air being discharged into the interior in the heater core 4 to perform heating.

In addition, a reservoir tank 18, a water pump 19, and a low-temperature radiator 20 are provided in another coolant line passing through electric components 17, such as a PE module and the like, to circulate coolant. The heat pump system for a vehicle installed in the hybrid vehicle actuates the engine 13 to heat the coolant for performing heating, and performs cooling through a vapor compression cooling cycle using the compressor 8.

The conventional heat pump system for the vehicle installed in the hybrid vehicle has to operate the engine continuously since performing heating by heating the coolant for winter heating, resulting in poor low-temperature fuel efficiency and high carbon dioxide emissions. Additionally, it takes much time to heat coolant and supply the heated coolant to the heater core, and in this instance, the comfort of passengers inside the vehicle is reduced. Furthermore, as a test result in a fuel efficiency evaluation mode, fuel efficiency is reduced by 7% at low temperature of −7° C. compared to room temperature. In this instance, the air conditioner is operated, the fuel efficiency is reduced by up to 25%.

DISCLOSURE

Technical Problem

Accordingly, the present invention has been made in view of the above-mentioned problems occurring in the related art, and it is an object of the present invention to provide a heat pump system for a vehicle, which has improved air conditioning efficiency, can considerably reduce the size of an air-cooled condenser, and greatly reduce cost and a package size.

Technical Solution

To accomplish the above-mentioned objects, according to the present invention, there is provided a heat pump system for a vehicle including: a refrigerant line which circulates through a compressor, an outdoor heat exchanger, an expansion means, and an indoor heat exchanger, and in which refrigerant circulating through the indoor heat exchanger exchanges heat with air discharged to the interior; a first coolant line which circulates through an engine and a heater core, and in which coolant circulating through the heater core exchanges heat with air discharged to the interior; and a second coolant line which circulates through electric components and an electric radiator, a water-cooled condenser which exchanges heat between engine heat of the first coolant line and the refrigerant; and a chiller which exchanges heat between electric heat of the second coolant line and the refrigerant, wherein the water-cooled condenser is provided downstream of the compressor in a refrigerant flow direction, and the chiller is provided upstream of the compressor in the refrigerant flow direction.

The engine heat and the electric heat can be selectively used for heating, and the water-cooled condenser and the chiller can respectively absorb both the engine heat and the electric heat.

A first expansion valve, which selectively expands or bypasses the refrigerant, is provided between the compressor and the outdoor heat exchanger, and the water-cooled condenser is positioned between the compressor and the first expansion valve.

A second expansion valve, which selectively expands the refrigerant or changes the direction of the refrigerant towards the chiller, is provided between the outdoor heat exchanger and the indoor heat exchanger, and the chiller is positioned between the second expansion valve and the compressor, such that the refrigerant passing through the outdoor heat exchanger circulates to the compressor after passing through the second expansion valve and the indoor heat exchanger or circulates to the compressor after passing through the chiller.

The heat pump system for a vehicle further includes: a first direction-changing valve which is provided upstream of the engine in the coolant flow direction; and a second direction-changing valve which is provided downstream of the engine in the coolant flow direction, wherein the coolant passing through the water-cooled condenser and the heater core by the control of the first direction-changing valve and the second direction-changing valve selectively passes through or bypasses the engine.

In the cooling mode, the refrigerant discharged from the compressor is primarily cooled in the water-cooled condenser, and then, secondarily cooled in the outdoor heat exchanger.

In the cooling mode, when the engine is stopped, the refrigerant discharged from the compressor is sequentially cooled in the water-cooled condenser and the outdoor heat exchanger, and the flow of the coolant in the water-cooled condenser is stopped. In the cooling mode, when the engine is operating, the refrigerant discharged from the compressor is sequentially cooled in the water-cooled condenser and the outdoor heat exchanger, and the coolant passing through the engine flows in the water-cooled condenser.

In the heating mode, when the engine is stopped, the coolant bypasses the engine, the coolant in the first coolant line heated by the refrigerant in the water-cooled condenser is supplied to the heater core to perform heating, and the coolant in the second coolant line passing through the electric components exchanges heat with the refrigerant in the chiller, so the refrigerant passing through the chiller absorbs heat, and then circulates to the compressor. In the heating mode, when the engine is operating, the coolant passing through the engine and the water-cooled condenser is supplied to the heater core to perform heating.

In the dehumidification mode, when the engine is stopped, the coolant bypasses the engine, the coolant in the first coolant line heated by the refrigerant in the water-cooled condenser is supplied to the heater core to perform heating, and the refrigerant in the refrigerant line expanded by passing through the outdoor heat exchanger is evaporated in the indoor heat exchanger and circulates through the compressor. In the dehumidification mode, when the engine is operating, the coolant passing through the engine and the water-cooled condenser is supplied to the heater core to perform heating.

In another aspect of the present invention, there is provided a heat pump system for a vehicle including: a refrigerant line which circulates through a compressor, an outdoor heat exchanger, an expansion means, and an indoor heat exchanger, and in which refrigerant circulating through the indoor heat exchanger exchanges heat with air discharged to the interior; a first coolant line which circulates through an engine and a heater core, and in which coolant circulating through the heater core exchanges heat with air discharged to the interior; and a second coolant line which circulates through electric components and an electric radiator, a water-cooled condenser which exchanges heat between engine heat of the first coolant line and the refrigerant; and a chiller which exchanges heat between electric heat of the second coolant line and the refrigerant, wherein the engine heat and the electric heat can be selectively used for heating, and the water-cooled condenser and the chiller can respectively absorb both the engine heat and the electric heat.

Advantageous Effect

The heat pump system for the vehicle according to the present invention can heat the interior of a hybrid vehicle without operation of the engine in low-temperature environments by applying the heat pump system to the hybrid vehicle, improve fuel efficiency, reduce carbon dioxide emissions, and enhance the thermal comfort of passengers inside.

Additionally, by integrating the heat pump system with the existing air conditioner that using the heater core, the heat pump system for the vehicle according to the present invention can effectively heat the interior even in low-temperature environments as cold as −30° C. since switching to heating using coolant when the engine is operated.

In addition, the heat pump system has good cooling efficiency by cooling the water-cooled condenser using coolant of the PE module (electric components) due to the condenser configured to be both air-cooled and water-cooled, and is highly advantageous in terms of cost reduction and vehicle packaging since considerably reducing the size of the air-cooled condenser (outdoor heat exchanger) compared to the existing heat pump system.

MODE FOR INVENTION

Hereinafter, referring to attached drawings, a technical configuration of a heat pump system for a vehicle according to an embodiment of the present invention will described in detail as follows.

Figure 1:
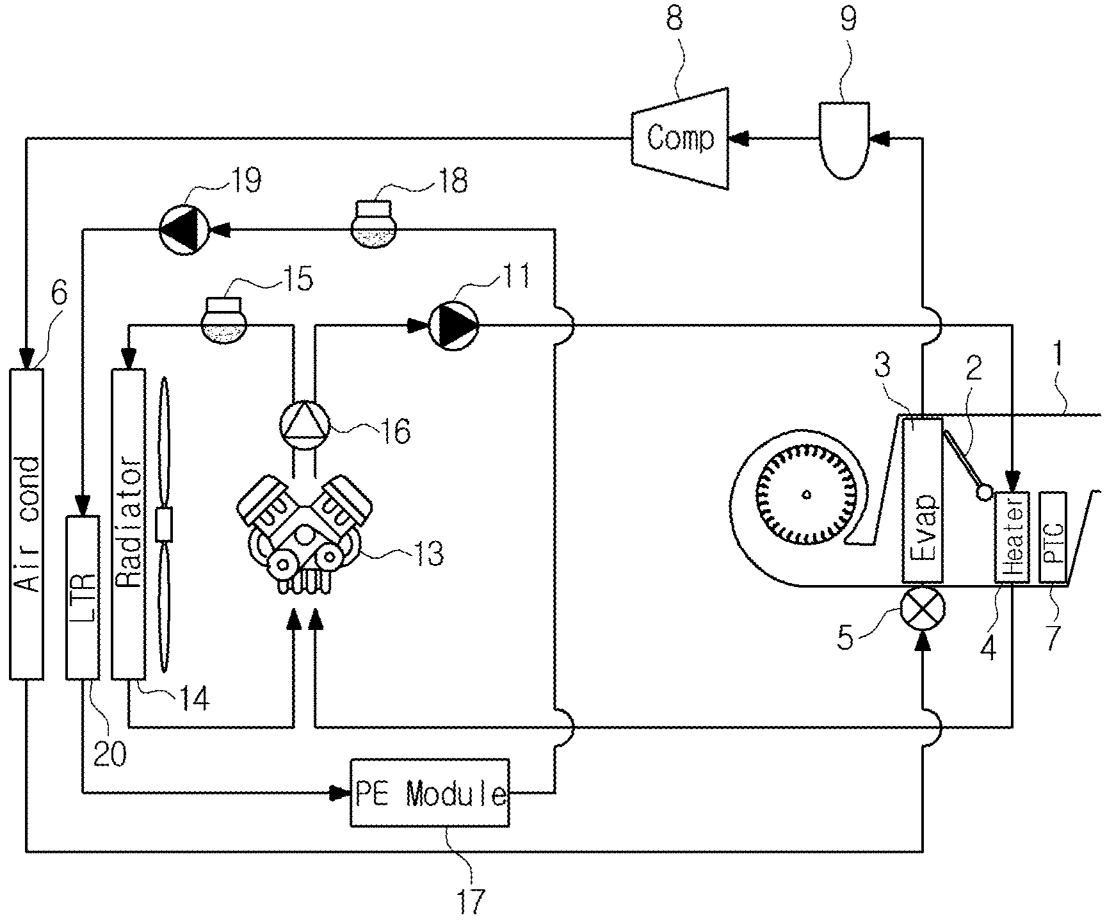
FIG. 1 is a conventional heat pump system.
Figure 2:
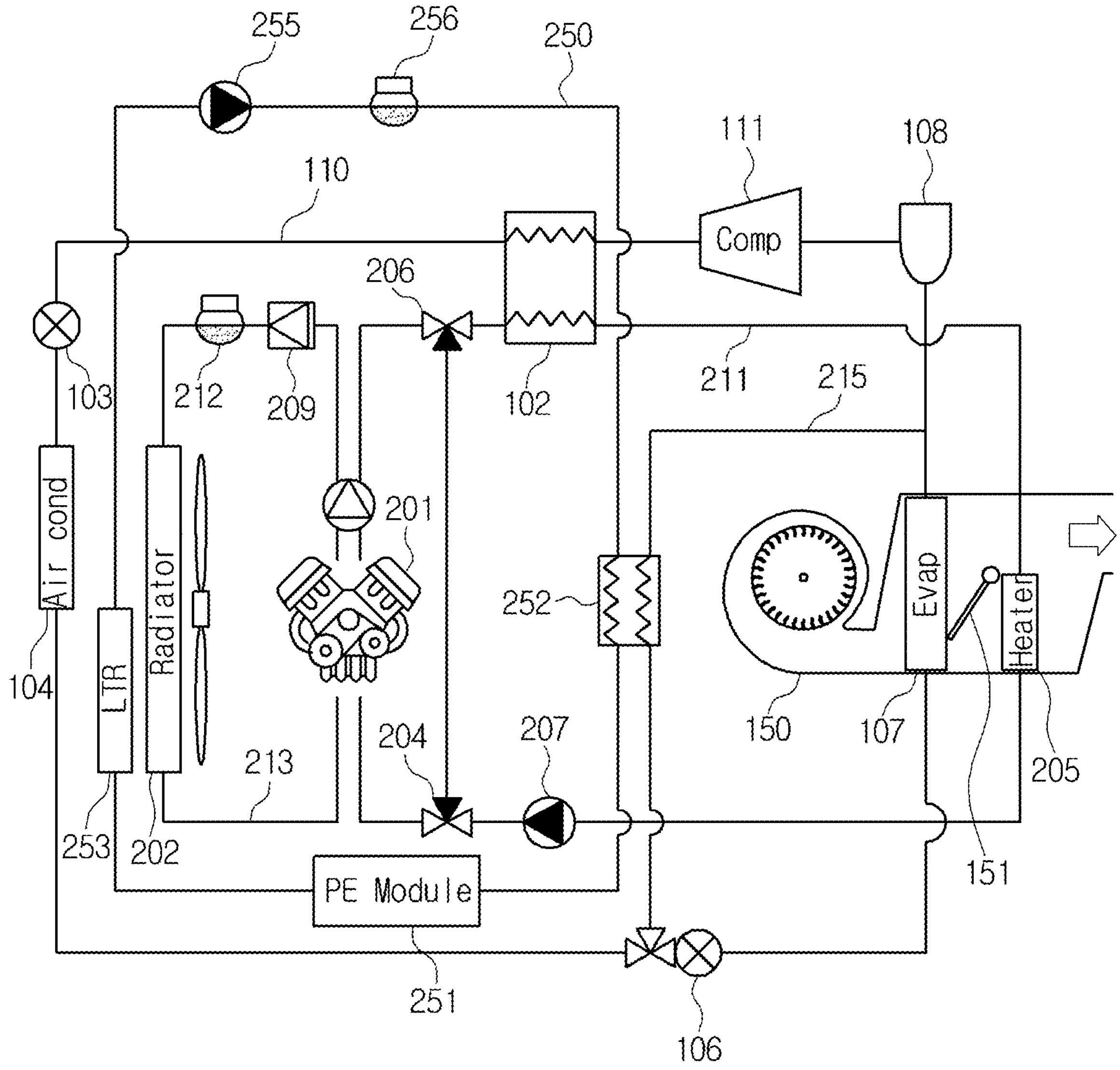
FIG. 2 illustrates a heat pump system for a vehicle according to an embodiment of the present invention.

Referring to FIG. 2, the heat pump system for the vehicle according to an embodiment of the present invention is installed in a hybrid vehicle (HEV) having an engine 201 and electric components 251 such as a power electric module (PE module) and the like. The heat pump system for the vehicle includes a refrigerant line 110, a first coolant line 211, and a second coolant line 250. In this case, the electric components 251 include the power electric module (PE module) and the like.

The refrigerant line 110 circulates through a compressor 111, an outdoor heat exchanger 104, an expansion means, and an indoor heat exchanger 107. The indoor heat exchanger 107 acts as an evaporator, and the refrigerant circulating through the indoor heat exchanger 107 exchanges heat with the air being discharged into the interior to cool the air. The compressor 111, a water-cooled condenser 102, a first expansion valve 103, the outdoor heat exchanger 104, a second expansion valve 106, the indoor heat exchanger 107, and an accumulator 108 are sequentially disposed in the refrigerant line 110 in a refrigerant flow direction.

The compressor 111 compresses and discharges the refrigerant, and an accumulator 108 is provided upstream of the compressor 111 in the refrigerant flow direction. The indoor heat exchanger 107 is located inside an air conditioning case 150 to exchange heat between the refrigerant and the air inside the air conditioning case 150. The outdoor heat exchanger 104 is located outside the air conditioning case 150 and exchanges heat between the refrigerant and the outdoor air.

The first expansion valve 103 is positioned between the compressor 111 and the outdoor heat exchanger 104 to selectively expand the refrigerant or to make the refrigerant bypass. That is, the first expansion valve 103 directly passes the refrigerant without expansion of the refrigerant in a cooling mode, but expands the refrigerant in a heating mode. The water-cooled condenser 102 is arranged between the compressor 111 and the first expansion valve 103. As described above, the first expansion valve 103 selectively performs a refrigerant expansion function and a refrigerant bypass function.

The second expansion valve 106 is arranged between the outdoor heat exchanger 104 and the indoor heat exchanger 107 to selectively expand the refrigerant or to change the direction of the refrigerant toward a chiller 252. The chiller 252 is arranged between the second expansion valve 106 and the compressor 111 to exchange heat between coolant of the second coolant line 250 and refrigerant of a refrigerant line 110. The refrigerant passing through the outdoor heat exchanger 104 sequentially passes through the second expansion valve 106 and the indoor heat exchanger 107 and circulates to the compressor 111, or through the chiller line 215 passes through the chiller 252 and circulates to the compressor 111.

That is, the second expansion valve 106 expands the refrigerant in the cooling mode, does not expand the refrigerant in the heating mode, and changes the direction of the refrigerant so that the refrigerant bypasses the indoor heat exchanger 107 and passes through the chiller 252. As described above, the second expansion valve 106 selectively performs the refrigerant expansion function and a refrigerant direction switching function. Additionally, in a dehumidification mode, the second expansion valve 106 expands some of the refrigerant and changes the direction of the remainder of the refrigerant toward the chiller 252.

The indoor heat exchanger 107 and the heater core 205 are sequentially arranged inside the air conditioning case 150 in the air flow direction. A blower unit for blowing air toward an air inlet of the air conditioning case 150 is provided. The heater core 205 exchanges heat with the air passing through the heater core 205 to heat the air. A temperature door 151 for controlling the temperature of the air being discharged into the interior of the vehicle is provided between the indoor heat exchanger 107 and the heater core 205. The temperature door 151 adjusts the amount of air between a cold air passage and a warm air passage as rotating within the air conditioning case 150.

The outdoor heat exchanger 104, the electric radiator 253, and the engine radiator 202 are positioned at the front side of the vehicle to exchange heat with the outdoor air, and a separate blowing fan may be provided for efficient heat exchange.

A first coolant line 211 circulates through an engine 201 and the heater core 205. The coolant circulating through the heater core 205 exchanges heat with the air being discharged into the interior within the air conditioning case 150. The second coolant line 250 circulates through the electric components 251 and the electric radiator 253. Moreover, the engine 201 is connected to an engine radiator 202 through an engine line 213. The engine line 213 includes a thermostat 209, a reservoir tank 212, and the engine radiator 202.

The water-cooled condenser 102 is provided between the compressor 111 and the outdoor heat exchanger 104, and exchanges heat between the refrigerant and the engine heat of the first coolant line 211. That is, the water-cooled condenser 102 is provided downstream of the compressor 111 in the refrigerant flow direction. The chiller 252 is positioned upstream of the compressor 111 in the refrigerant flow direction, and exchanges heat between the refrigerant and the electric heat of the second coolant line 250. That is, the chiller 252 is provided upstream of the compressor 111 in the refrigerant flow direction.

The coolant passing through the heater core 205 bypasses the engine 201, passes only through the water-cooled condenser 102, and then circulates through the heater core 205. Alternatively, the coolant passing through the heater core 205 bypasses the water-cooled condenser 102, passes only through the engine 201, and then, circulates through the heater core 205. Alternatively, the coolant passing through the heater core 205 passes through both the engine 201 and the water-cooled condenser 102, and then, circulates through the heater core 205.

The heat pump system for the vehicle includes a first direction-changing valve 204 and a second direction-changing valve 206. The first direction-changing valve 204 is provided upstream of the engine 201 in the coolant flow direction, and the second direction-changing valve 206 is provided downstream of the engine 201 in the coolant flow direction, the coolant passing through the water-cooled condenser 102 and the heater core 205 by the control of the first direction-changing valve 204 and the second direction-changing valve 206 selectively passes through or bypasses the engine 201.

That is, the first direction-changing valve 204 is provided between the heater core 205 and the engine 201 in the coolant flow direction, and makes the coolant passing through the heater core 205 selectively flow to the engine 201 or to the water-cooled condenser 102. The second direction-changing valve 206 is provided between the engine 201 and the water-cooled condenser 102 in the coolant flow direction. Furthermore, the second direction-changing valve 206 makes the coolant passing through the engine 201 flow to the water-cooled condenser 102 or make the coolant passing through the first direction-changing valve 204 bypass the engine 201 and flow to the water-cooled condenser 102.

The heat pump system for a vehicle can selectively use the engine heat and the electric heat for heating, and the water-cooled condenser 102 and the chiller 252 can respectively absorb both the engine heat and the electric heat. Moreover, in the cooling mode, the refrigerant discharged from the compressor 111 is primarily cooled in the water-cooled condenser 102, and then, secondarily cooled in the outdoor heat exchanger 104.

In more detail, in the first coolant line 211, the engine 201, the second direction-changing valve 206, the water-cooled condenser 102, the heater core 205, a water pump 207, the first direction-changing valve 204, and the engine 201 are sequentially arranged in the coolant flow direction. Additionally, in the engine line 213 passing through the engine 201, the thermostat 209, the reservoir tank 212, and the engine radiator 202 are sequentially arranged in the coolant flow direction. Furthermore, in the second coolant line 250, the electric components 251, the electric radiator 253, a water pump 255, a reservoir tank 256, and the chiller 252 are sequentially arranged in the coolant flow direction.

Figure 3:
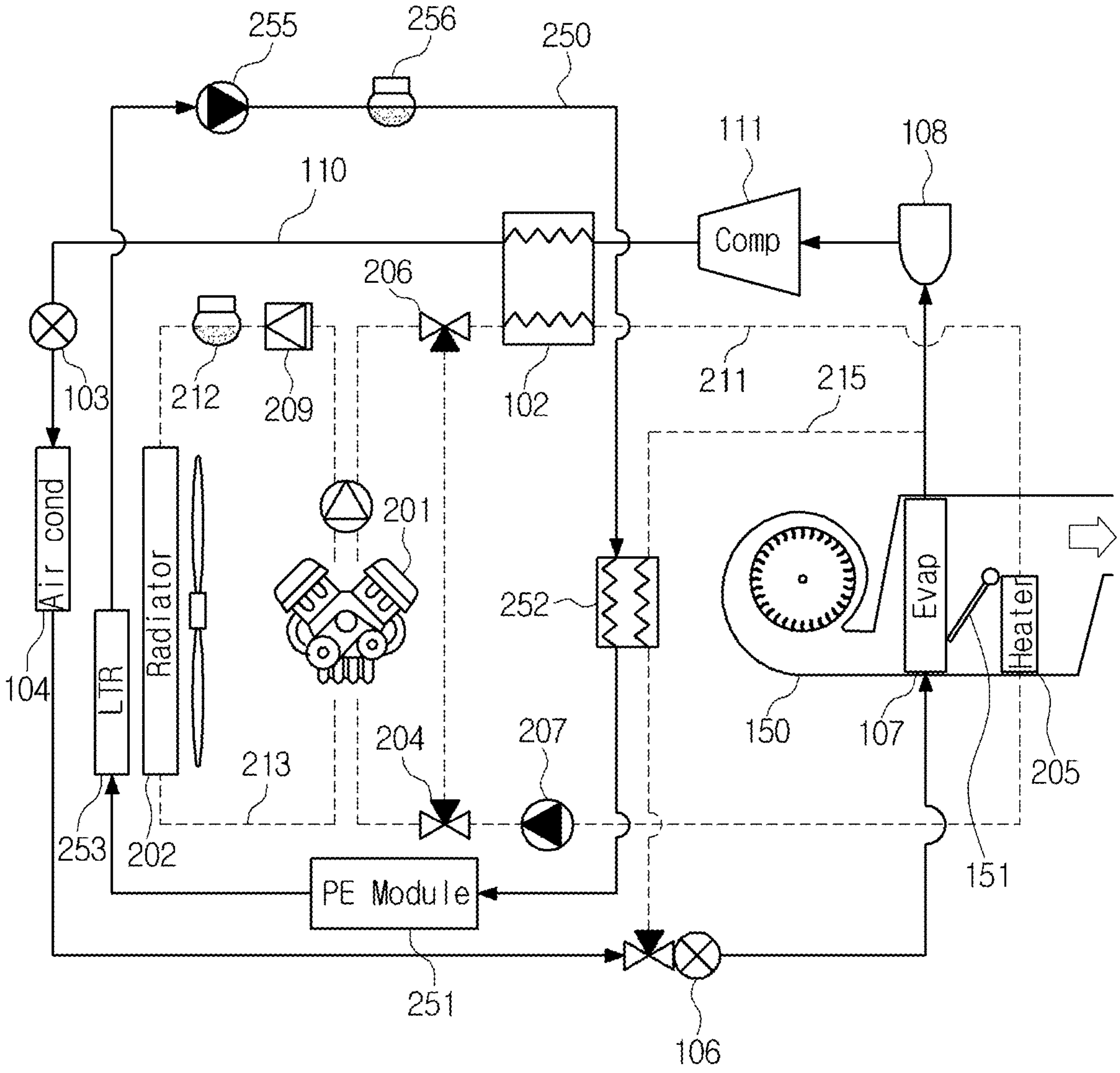
FIG. 3 illustrates an engine stop condition in a cooling mode of the heat pump system for a vehicle according to an embodiment of the present invention.

Referring to FIG. 3, in the cooling mode, when the engine is stopped, the refrigerant discharged from the compressor 111 is sequentially cooled in the water-cooled condenser 102 and the outdoor heat exchanger 104, and the flow of the coolant in the water-cooled condenser 102 is stopped.

Namely, the high-temperature and high-pressure refrigerant discharged from the compressor 111 is primarily cooled by the coolant in the water-cooled condenser 102, passes directly through the first expansion valve 103, and then, is secondarily cooled by the outdoor air in the outdoor heat exchanger 104. Thereafter, the secondarily cooled refrigerant is expanded in the second expansion valve 106, and then, exchanges heat with the indoor air while passing through the indoor heat exchanger 107, thereby cooling the interior. In addition, the coolant passing through the electric components 251 passes through the electric radiator 253 and the chiller 252, and then, circulates through the electric components 251. The flow of the coolant in the first coolant line 211 is stopped.

As described above, the high-temperature refrigerant discharged from the compressor 111 is primarily cooled in the water-cooled condenser 102 using a water-cooling method and secondarily cooled in the outdoor heat exchanger 104 using an air-cooling method, thereby enhancing the cooling performance. Moreover, since the heater core 205 is not operated, sufficient cooling performance can be secured even though the compressor 111 operate at low rotation speed without heat pick-up. That is, since the refrigerant is primarily cooled in the water-cooled condenser 102 and then secondarily cooled in the outdoor heat exchanger 104, the cooling performance is enhanced, and since coolant does not flow into the heater core 205, there is no heat pick-up, thereby maximizing the cooling performance.

Figure 4:
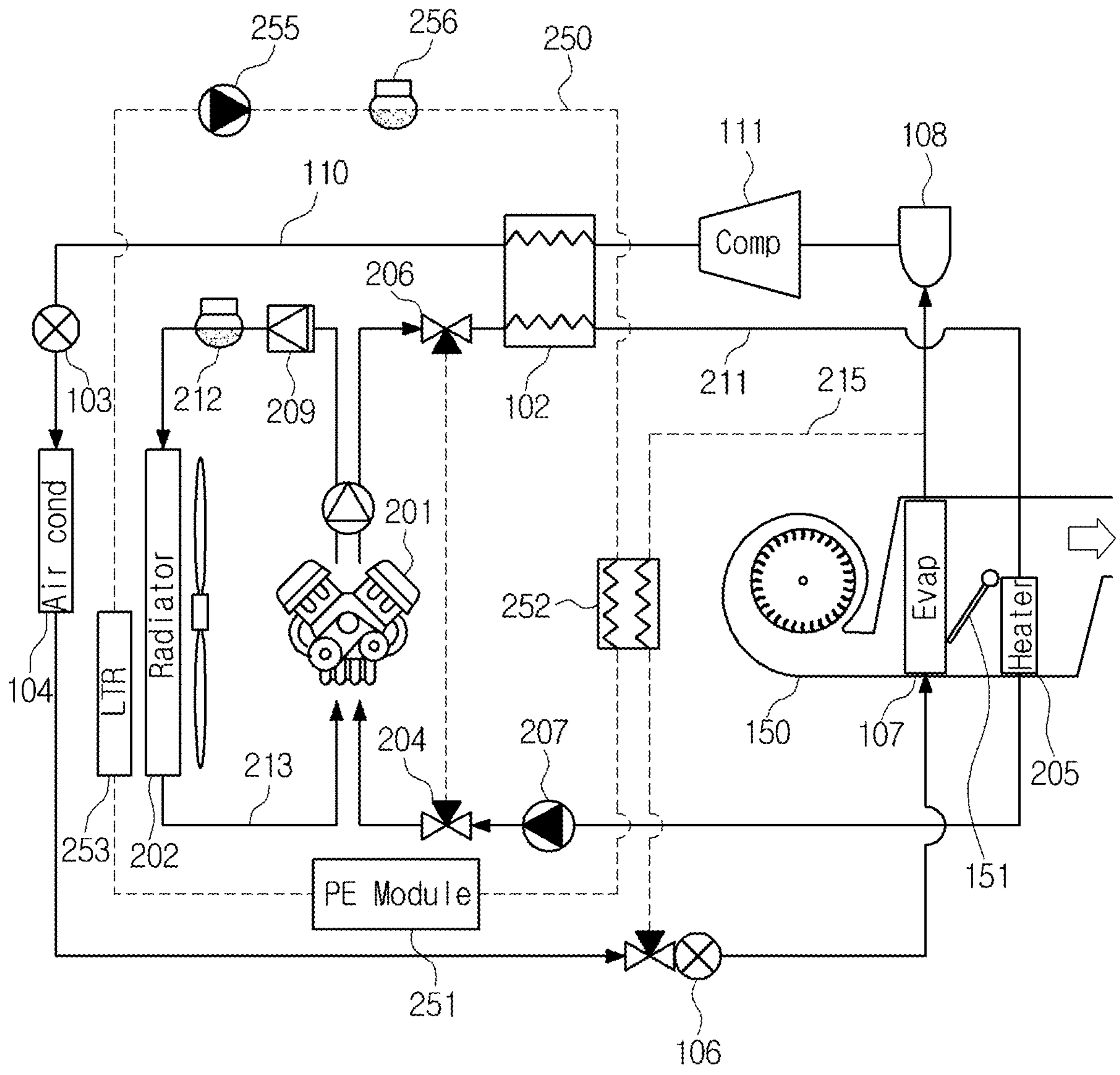
FIG. 4 illustrates an engine operation in the cooling mode of the heat pump system for a vehicle according to an embodiment of the present invention.

Referring to FIG. 4, in the cooling mode, when the engine is operating, the refrigerant discharged from the compressor 111 is sequentially cooled in the water-cooled condenser 102 and the outdoor heat exchanger 104, and the coolant passing through the engine 201 flows in the water-cooled condenser 102.

Namely, the high-temperature and high-pressure refrigerant discharged from the compressor 111 is primarily cooled by the coolant in the water-cooled condenser 102, and then, passes directly through the first expansion valve 103. Thereafter, the refrigerant is secondarily cooled by the outdoor air in the outdoor heat exchanger 104, is expanded at the second expansion valve 106, and then, exchanges heat with the indoor air while passing through the indoor heat exchanger 107, thereby cooling the interior.

The coolant passing through the heater core 205 passes through the engine 201 after going through the water pump 207 and the first direction-changing valve 204, and then, circulates through the heater core 205 after going through the second direction-changing valve 206 and the water-cooled condenser 102. In this case, the flow of the coolant in the second coolant line 250 is stopped.

Figure 5:
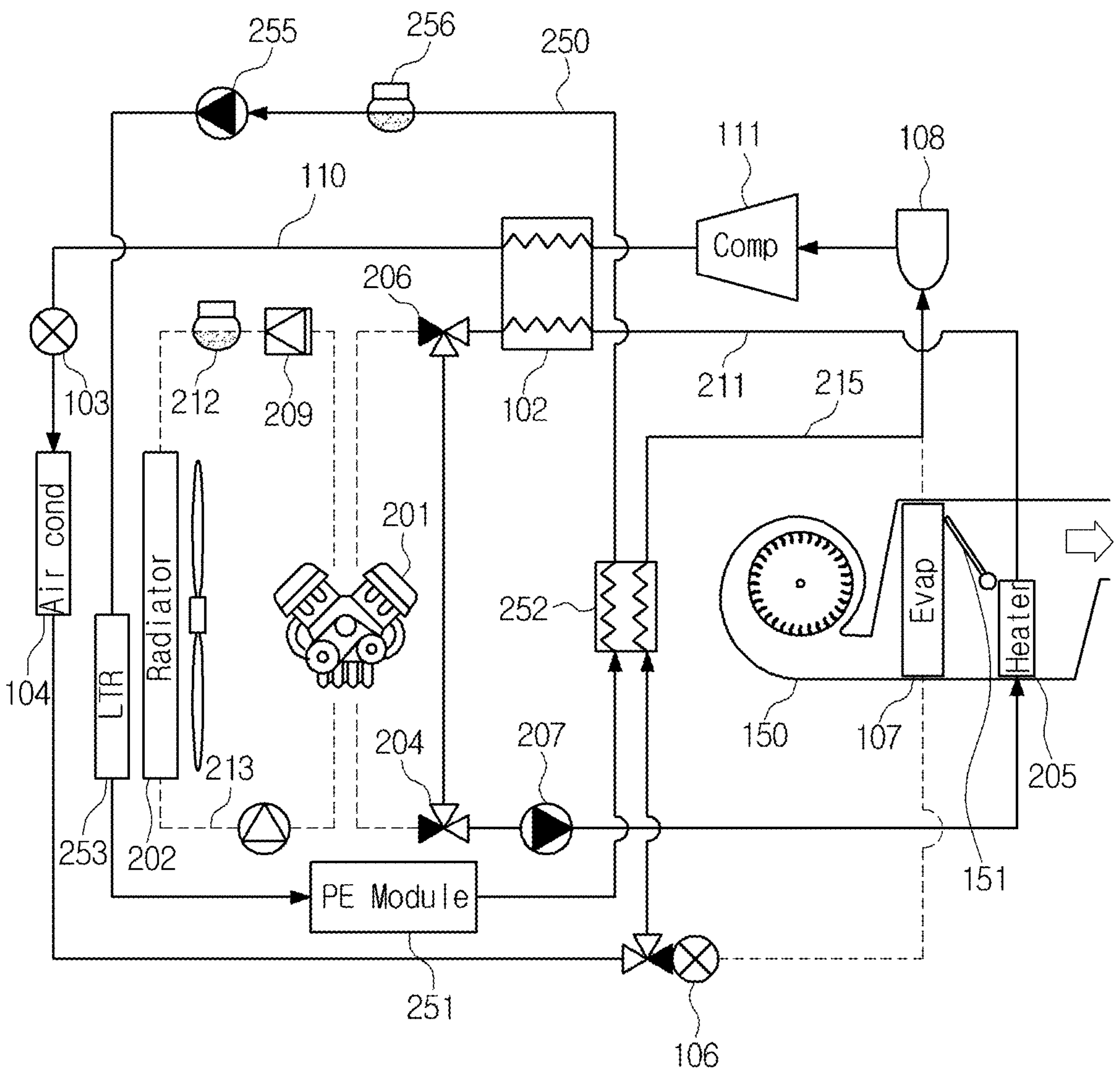
FIG. 5 illustrates an engine stop condition in a heating mode of the heat pump system for a vehicle according to an embodiment of the present invention.

Referring to FIG. 5, in the heating mode, when the engine is stopped, the coolant bypasses the engine 201, and the coolant in the first coolant line 211, heated by the refrigerant in the water-cooled condenser 102, is supplied to the heater core 205 to perform heating. The coolant in the second coolant line 250, passing through the electric components 251, exchanges heat with the refrigerant in the chiller 252, so the refrigerant passing through the chiller 252 absorbs heat, and then circulates to the compressor 111.

That is, the high-temperature and high-pressure refrigerant discharged from the compressor 111 is cooled by the coolant in the water-cooled condenser 102, and is expanded at the first expansion valve 103. The expanded refrigerant passes through the outdoor heat exchanger 104, changes the direction at the second expansion valve 106 to pass through the chiller 252, and then circulates through the compressor 111. In this case, the refrigerant does not flow to the indoor heat exchanger 107.

The coolant passing through the electric components 251 sequentially passes through the chiller 252, the reservoir tank 256, the water pump 255, and the electric radiator 253, and then, circulates through the electric components 251. Moreover, the coolant passing through the heater core 205 passes through the water-cooled condenser 102 after going through the water pump 207, the first direction-changing valve 204, and the second direction-changing valve 206, and then, circulates through the heater core 205. The coolant passing through the heater core 205 exchanges heat with the indoor air to perform heating.

Figure 6:
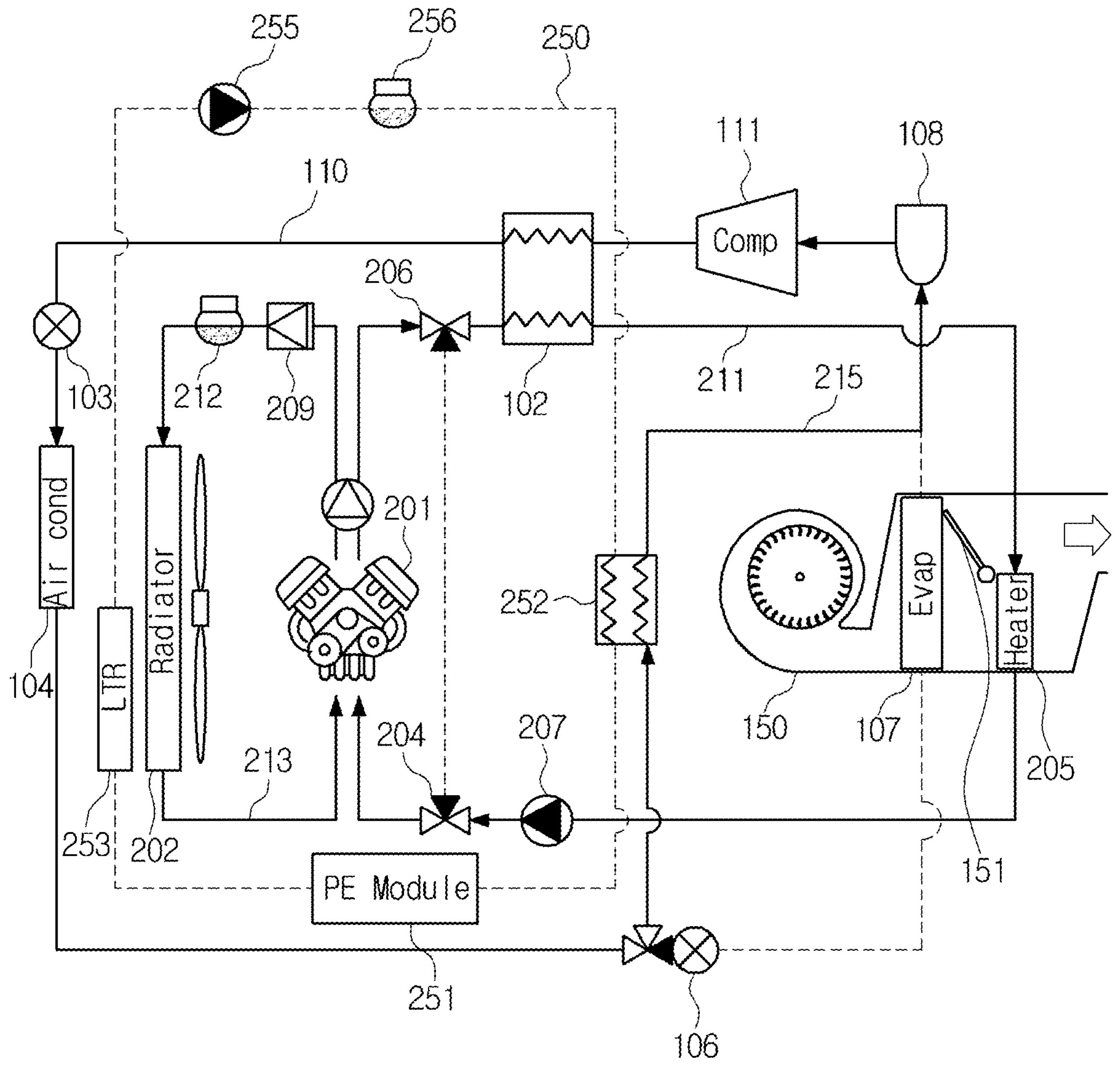
FIG. 6 illustrates an engine operation in the heating mode of the heat pump system for a vehicle according to an embodiment of the present invention.

Referring to FIG. 6, in the heating mode, when the engine is operating, the coolant passing through the engine 201 and the water-cooled condenser 102 is supplied to the heater core 205 to perform heating.

That is, the high-temperature and high-pressure refrigerant discharged from the compressor 111 is cooled by the coolant in the water-cooled condenser 102, and is expanded at the first expansion valve 103. The expanded refrigerant passes through the outdoor heat exchanger 104, changes the direction at the second expansion valve 106 to pass through the chiller 252, and then circulates through the compressor 111. In this case, the refrigerant does not flow to the indoor heat exchanger 107.

The coolant passing through the heater core 205 passes through the engine 201 after going through the water pump 207 and the first direction-changing valve 204, and then, circulates through the heater core 205 after going through the second direction-changing valve 206 and the water-cooled condenser 102. The coolant passing through the heater core 205 exchanges heat with the indoor air to heat the interior. In addition, the coolant in the engine line 213 passing through the engine 201 is cooled in the engine radiator 202.

Figure 7:
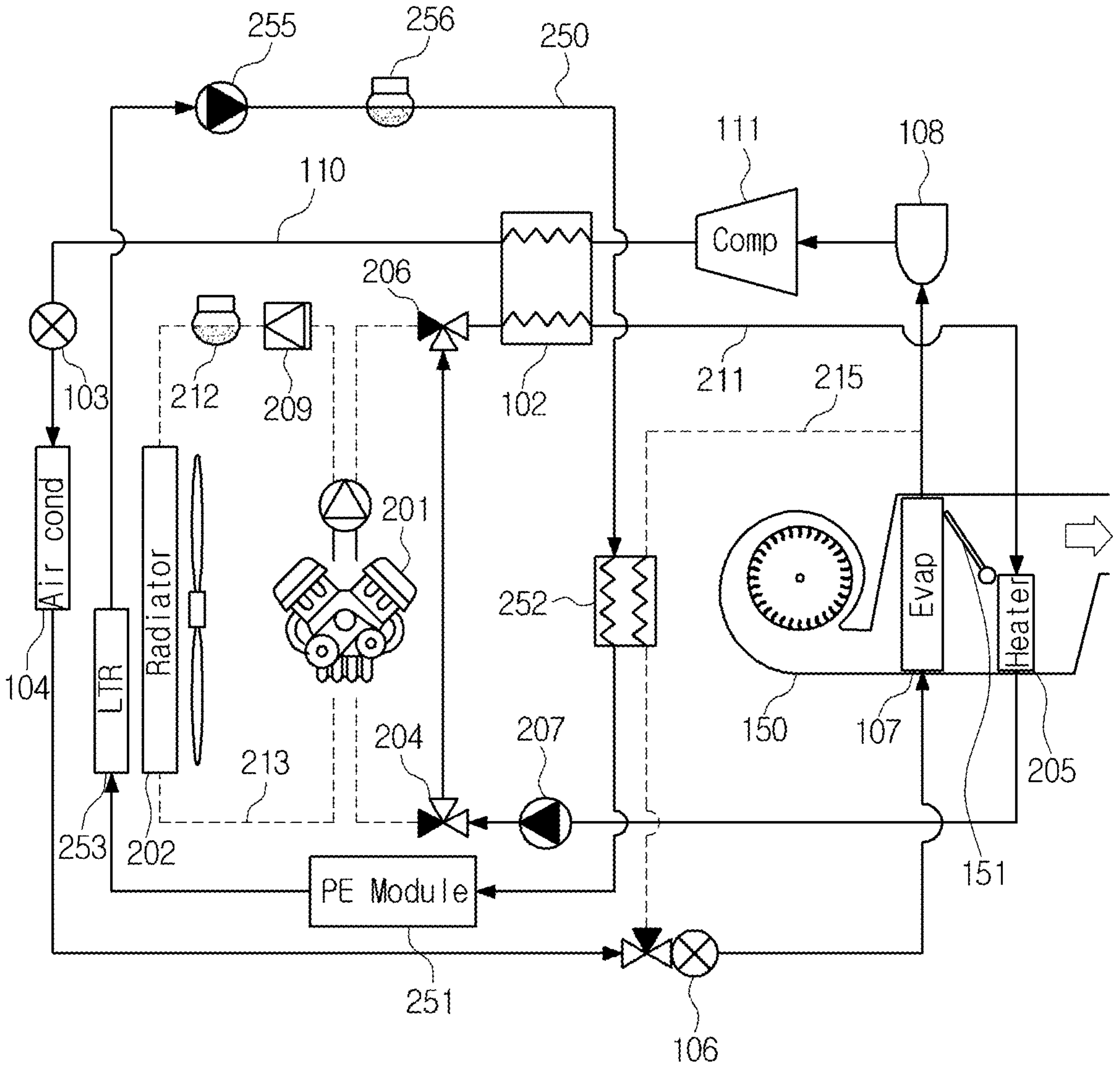
FIG. 7 illustrates an engine stop condition in a dehumidification mode of the heat pump system for a vehicle according to an embodiment of the present invention.

Referring to FIG. 7, in the dehumidification mode, when the engine is stopped, the coolant bypasses the engine 201, and the coolant in the first coolant line 211, heated by the refrigerant in the water-cooled condenser 102, is supplied to the heater core 205 to perform heating, and the refrigerant in the refrigerant line 110, expanded by passing through the outdoor heat exchanger 104, is evaporated in the indoor heat exchanger 107 and circulates through the compressor 111.

That is, the high-temperature and high-pressure refrigerant discharged from the compressor 111 is cooled by the coolant in the water-cooled condenser 102, directly passes through the first expansion valve 103, and then is cooled while passing through the outdoor heat exchanger 104. Thereafter, the refrigerant is expanded at the second expansion valve 106, passes through the indoor heat exchanger 107, and then, circulates through the compressor 111. The refrigerant passing through the indoor heat exchanger 107 is evaporated and circulates through the compressor 111 to perform dehumidification.

The coolant passing through the electric components 251 sequentially passes through the electric radiator 253, the water pump 255, the reservoir tank 256, and the chiller 252, and then, circulates through the electric components 251. Furthermore, the coolant passing through the heater core 205 sequentially passes through the water pump 207, the first direction-changing valve 204, the second direction-changing valve 206, and the water-cooled condenser 102, and then, circulates through the heater core 205. In this case, the coolant passing through the heater core 205 exchanges heat with the indoor air to perform heating.

Figure 8:
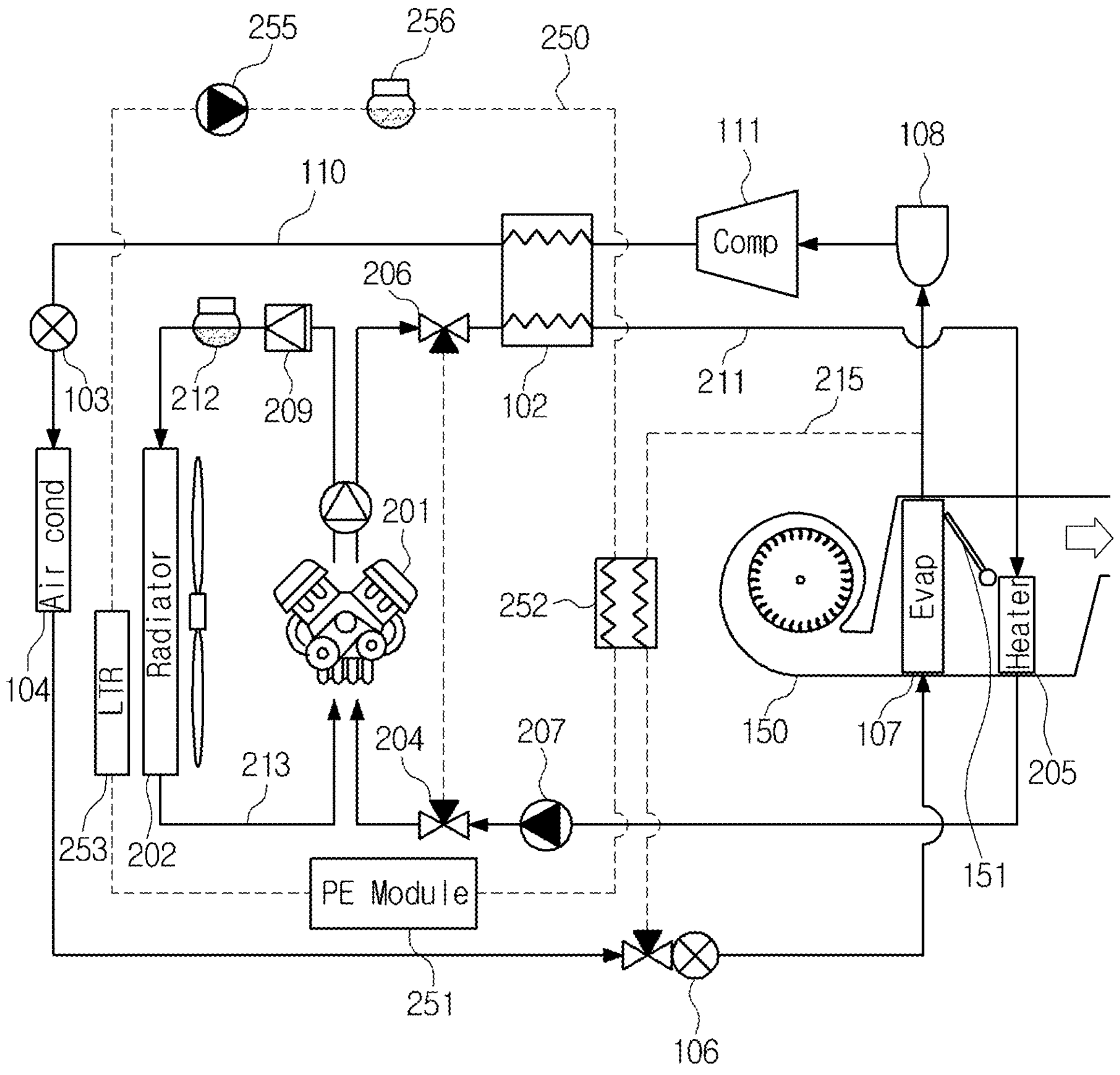
FIG. 8 illustrates an engine operation in the dehumidification mode of the heat pump system for a vehicle according to an embodiment of the present invention.

Referring to FIG. 8, in the dehumidification mode, when the engine is operating, the coolant passing through the engine 201 and the water-cooled condenser 102 is supplied to the heater core 205 to perform heating.

That is, the high-temperature and high-pressure refrigerant discharged from the compressor 111 is cooled by the coolant in the water-cooled condenser 102, directly passes through the first expansion valve 103, and then is cooled while passing through the outdoor heat exchanger 104. Thereafter, the refrigerant is expanded at the second expansion valve 106, passes through the indoor heat exchanger 107, and then, circulates through the compressor 111. The refrigerant passing through the indoor heat exchanger 107 is evaporated and circulates through the compressor 111 to perform dehumidification.

The coolant passing through the heater core 205 passes through the engine 201 after going through the water pump 207 and the first direction-changing valve 204, and then, circulates through the heater core 205 after going through the second direction-changing valve 206 and the water-cooled condenser 102. The coolant passing through the heater core 205 exchanges heat with the indoor air to heat the interior. In addition, the coolant in the engine line 213 passing through the engine 201 is cooled in the engine radiator 202. In this case, the flow of the coolant in the second coolant line 250 is stopped.

The heat pump system for the vehicle according to an embodiment of the present invention can heat the interior of a hybrid vehicle without operation of the engine in low-temperature environments by applying the heat pump system to the hybrid vehicle, improve fuel efficiency, reduce carbon dioxide emissions, and enhance the thermal comfort of passengers inside. Additionally, by integrating the heat pump system with the existing air conditioner using the heater core, the heat pump system for the vehicle according to an embodiment of the present invention can effectively heat the interior even in low-temperature environments as cold as −30° C. since switching to heating using coolant when the engine is operated.

In addition, the heat pump system has good cooling efficiency by cooling the water-cooled condenser using coolant of the PE module (electric components) due to the condenser configured to be both air-cooled and water-cooled, and is highly advantageous in terms of cost reduction and vehicle packaging since considerably reducing the size of the air-cooled condenser (outdoor heat exchanger) compared to the existing heat pump system.

To sum up, the heat pump system for the vehicle according to an embodiment of the present invention by configuring a water-cooled condenser, in a heating mode can recover waste heat from electric components, which is worthless as heat, to operate the heat pump system. The system operates as a heat pump system to heat the interior in the initial stage in low temperature environments, and when the engine temperature increases over time, can perform hybrid air conditioning operation to perform heating using the heater core. Therefore, while conventional heat pump systems can only operate at outdoor air temperature of −20° C., but the heat pump system according to the present invention can effectively provides heating even in extremely cold environments of −30° C.

In addition, the air-cooled condenser (outdoor heat exchanger) can be reduced to about half in size compared to the conventional condenser, so is advantageous in packaging of a vehicle and can be integrated or stacked with the electric radiator. Furthermore, the air-cooled condenser operates by recovering waste heat from the electric components through the chiller, thereby improving air conditioning efficiency and enabling frost prevention operations. The water-cooled condenser provides heated coolant to the interior by heating the coolant in the heating mode, and performs the function to cool the refrigerant in the cooling mode.

Furthermore, when a simulation in a condition that the coolant of about 95° C. in the engine cooling module (first coolant line) flows to the water-cooled condenser is performed, under high load conditions, the temperature of the refrigerant discharged from the compressor is about 100.4° C. Accordingly, it shows almost no performance difference compared to the temperature (100.7° C.) when the coolant does not flow. Under low load conditions, although the coefficient of performance slightly decreases, the overall heat dissipation capacity of the evaporator (indoor heat exchanger) remains at an equivalent level, thus not causing degradation in air conditioning performance.

While the heat pump system for the vehicle of the present invention has been described with reference to the illustrated embodiments, the descriptions are exemplary only, and it will be understood by those skilled in the art that various modifications and equivalents of the embodiments are possible. Therefore, the true technical protection scope should be defined by the technical spirit of the appended claims.

The invention claimed is:

1. A heat pump system for a vehicle comprising:

a refrigerant line which circulates through a compressor, an outdoor heat exchanger, a first expansion valve and a second expansion valve, and an indoor heat exchanger, and in which refrigerant circulating through the indoor heat exchanger exchanges heat with air discharged to an interior;

a first coolant line which circulates through an engine and a heater core, and in which coolant circulating through the heater core exchanges heat with air discharged to the interior;

a second coolant line which circulates through electric components and an electric radiator;

a water-cooled condenser which exchanges heat between engine heat of the first coolant line and the refrigerant;

a chiller which exchanges heat between electric heat of the second coolant line and the refrigerant;

a first direction-changing valve which is provided upstream of the engine in a coolant flow direction; and a second direction-changing valve which is provided downstream of the engine in the coolant flow direction, wherein the coolant passing through the water-cooled condenser and the heater core by the control of the first direction-changing valve and the second direction-changing valve selectively passes through or bypasses the engine, and wherein the water-cooled condenser is provided downstream of the compressor in a refrigerant flow direction, and the chiller is provided upstream of the compressor in the refrigerant flow direction.

2. The heat pump system according to claim 1, wherein the engine heat and the electric heat can be selectively used for heating, and the water-cooled condenser and the chiller can respectively absorb both the engine heat and the electric heat.

3. The heat pump system according to claim 1, wherein the first expansion valve, which selectively expands or bypasses the refrigerant, is provided between the compressor and the outdoor heat exchanger, and the water-cooled condenser is positioned between the compressor and the first expansion valve.

4. The heat pump system according to claim 3, wherein the second expansion valve, which selectively expands the refrigerant or changes the direction of the refrigerant towards the chiller, is provided between the outdoor heat exchanger and the indoor heat exchanger, and the chiller is positioned between the second expansion valve and the compressor, such that the refrigerant passing through the outdoor heat exchanger circulates to the compressor after passing through the second expansion valve and the indoor heat exchanger or circulates to the compressor after passing through the chiller.

5. The heat pump system according to claim 1, wherein in the cooling mode, the refrigerant discharged from the compressor is first cooled in the water-cooled condenser, and then cooled in the outdoor heat exchanger.

6. The heat pump system according to claim 1, wherein in the cooling mode, when the engine is stopped, the refrigerant discharged from the compressor is sequentially cooled in the water-cooled condenser and the outdoor heat exchanger, and the flow of the coolant in the water-cooled condenser is stopped, and wherein in the cooling mode, when the engine is operating, the refrigerant discharged from the compressor is sequentially cooled in the water-cooled condenser and the outdoor heat exchanger, and the coolant passing through the engine flows in the water-cooled condenser.

7. The heat pump system according to claim 1, wherein in the heating mode, when the engine is stopped, the coolant bypasses the engine, the coolant in the first coolant line heated by the refrigerant in the water-cooled condenser is supplied to the heater core to perform heating, and the coolant in the second coolant line passing through the electric components exchanges heat with the refrigerant in the chiller, so the refrigerant passing through the chiller absorbs heat, and then circulates to the compressor, and wherein in the heating mode, when the engine is operating, the coolant passing through the engine and the water-cooled condenser is supplied to the heater core to perform heating.

8. A heat pump system for a vehicle comprising:

a refrigerant line which circulates through a compressor, an outdoor heat exchanger, a first expansion valve and a second expansion valve, and an indoor heat exchanger, and in which refrigerant circulating through the indoor heat exchanger exchanges heat with air discharged to an interior;

a first coolant line which circulates through an engine and a heater core, and in which coolant circulating through the heater core exchanges heat with air discharged to the interior;

a second coolant line which circulates through electric components and an electric radiator;

a water-cooled condenser which exchanges heat between engine heat of the first coolant line and the refrigerant; and a chiller which exchanges heat between electric heat of the second coolant line and the refrigerant, wherein the water-cooled condenser is provided downstream of the compressor in a refrigerant flow direction, and the chiller is provided upstream of the compressor in the refrigerant flow direction, wherein in the dehumidification mode, when the engine is stopped, the coolant bypasses the engine, the coolant in the first coolant line heated by the refrigerant in the water-cooled condenser is supplied to the heater core to perform heating, and the refrigerant in the refrigerant line expanded by passing through the outdoor heat exchanger is evaporated in the indoor heat exchanger and circulates through the compressor, and wherein in the dehumidification mode, when the engine is operating, the coolant passing through the engine and the water-cooled condenser is supplied to the heater core to perform heating.

* * * * *